United States Patent [19]
Hardin

[11] Patent Number: 5,897,173
[45] Date of Patent: Apr. 27, 1999

[54] CONTROL ASSEMBLY FOR PROVIDING REDUNDANT CONTROL OUTPUTS FOR OPERATING A PARKING BRAKE SYSTEM

[75] Inventor: Michael A. Hardin, Ferguson, Mo.

[73] Assignee: Brake Parts, Inc., McHenry, Ill.

[21] Appl. No.: 08/861,401

[22] Filed: May 21, 1997

[51] Int. Cl.[6] .................................................. B60T 13/22
[52] U.S. Cl. .................... 303/3; 188/1.11 R; 188/106 R; 188/170; 188/151 A; 74/523; 267/158; 200/61.87; 303/71
[58] Field of Search .................................. 303/3, 15, 20, 303/50–56, 71, 13–14; 188/106 P, 106 F, 106 R, 170, 151 A, 1.11 E, 1.11 R; 74/538, 523, 491; 200/61.87, 283, 339, 437, 438, 335; 267/158–165; 192/219.7, 222, 221

[56] References Cited

U.S. PATENT DOCUMENTS

| | | | |
|---|---|---|---|
| 4,281,736 | 8/1981 | Lizzio | 188/106 R |
| 4,310,064 | 1/1982 | Kazarian, Jr. | |
| 4,462,487 | 7/1984 | Warwick et al. | 188/106 F |
| 4,553,650 | 11/1985 | Warwick et al. | 74/540 |
| 5,029,681 | 7/1991 | Swiatek | 192/219.7 |
| 5,159,850 | 11/1992 | Naoi et al. | 74/523 |
| 5,370,449 | 12/1994 | Edelen et al. | |
| 5,443,306 | 8/1995 | Broome | |
| 5,601,162 | 2/1997 | Heimann | 188/170 |
| 5,704,693 | 1/1998 | Mackiewicz | 303/3 |
| 5,793,007 | 8/1998 | Matsumoto | 74/523 |

*Primary Examiner*—Douglas C. Butler
*Attorney, Agent, or Firm*—St. Onge Steward Johnston & Reens LLC

[57] ABSTRACT

A parking brake control assembly for a motor vehicle is provided which includes a housing, a movable actuator disposed in the housing which is operable to apply or release parking brakes, and an actuator spring pivotably mounted in the housing. The actuator spring pivots in response to the movement of the movable actuator. A portion of the actuator spring is biased to a first position by a predetermined force, and if the force applied on the portion exceeds the predetermined force, the portion moves to a second position. The housing also houses a switch actuatable by movement of the movable actuator for indicating desired position of the parking brakes, and a piston in fluid communication with a source of fluid. The piston is positioned adjacent the portion of the actuator spring, and the piston is movable by the pivoting movement of the actuator spring to cause fluid to be ejected such that the ejected fluid indicates desired position of the parking brakes.

11 Claims, 3 Drawing Sheets

CONTROL ASSEMBLY FOR PROVIDING REDUNDANT CONTROL OUTPUTS FOR OPERATING A PARKING BRAKE SYSTEM

FIELD OF THE INVENTION

The invention relates to a control assembly for operating a parking brake system, and more specifically, to a control assembly which provides redundant control outputs for operating a parking brake system.

BACKGROUND OF THE INVENTION

Braking systems, including parking brake systems, for vehicles have become increasingly complex and costly to manufacture over recent years. As braking systems in general have become more complicated, so have the mechanisms for their control. The increased complexity of the brake control mechanisms have typically resulted in the shift away from the pneumatic or hydraulic-based control mechanisms to an electronic-based control mechanism.

A significant problem with an electronic-based control mechanism for a braking system is the consequences posed by an unexpected loss of electrical power. Such electrical power failure may create a dangerous condition leading to bodily injuries and property damage. The prior art discloses brake control systems designed to prevent such a hazardous condition from occurring in the event of power failure by providing an additional mechanically actuated means for controlling brake application.

For example, U.S. Pat. No. 5,443,306 ("the '306 patent") to Broome discloses an electronically controlled braking system for a motor vehicle which includes a foot-operable brake valve 11 for electronically controlling brake application (col. 4, lines 48–56). The foot valve 11 includes a body 60 defining an exhaust port 78 which houses solenoid valves having valve members 98, 99, an abutment member 68, a coil spring 66, a tapered coil compression spring 76, a modulating piston 62 having an annular downward extension 75, a valve member 80 having a valve seat 81, a compression spring 82, and a differential piston 91 (col. 9, line 58–col. 10, line 16; FIG. 2). When there is failure of the electronic system, the solenoid valves of the foot valve 11 are de-energized and the above-described components of the foot valve 11 interact to allow the foot valve 11 to function as a standard pneumatic foot brake operating valve (col. 9, line 58–col. 10, line 22).

The disadvantages posed by the '306 patent are complexity and cost. Given that the foot valve 11 includes numerous discrete components which have to be assembled together (see FIG. 2), some of which have been described above, the electronically controlled braking system of the '306 patent is complex to manufacture. Furthermore, this complexity and the number of components needed make the electronically controlled braking system of the '306 patent costly to manufacture.

U.S. Pat. No. 5,370,449 ("the '449 patent") to Edelen discloses an electrically controlled parking brake system which includes an electrically operated valve 20 and a mechanical valve 18 (col. 2, lines 18–36). The mechanical valve 18 is mechanically actuated by a valve actuator 22, and the electrically operated valve 20 is actuated by a pair of solenoids 34, 36, which are controlled from a transmission shift console 40 (col. 2, lines 18–55; FIG. 1). The electrically operated valve 20 is held in position following actuation of the solenoids 34, 36 by a mechanical detent 38, so that in the event of power loss, the valve 20 will retain the previous position (col. 2, lines 36–52). If the last position of the valve 20 retained was the parking brakes applied position, then in the event of power loss, the parking brakes will remain applied (col. 2, lines 39–47). If the last position of the valve 20 retained was the parking brakes released position, then in the event of power loss, the control of the brakes is returned to the mechanical valve 18 (col. 2, lines 47–52).

Like the disadvantages presented by the '306 patent, the disadvantages posed by the '449 patent are complexity and cost. It is complex and costly to manufacture the electrically controlled parking brake system of the '449 patent since there are required the mechanical valve 18, the electrically operated valve 20 with solenoids 34, 36, and numerous components required to interconnect the two valves.

What is desired, therefore, is a parking brake control assembly which provides redundant control outputs to ensure parking brake integrity in case of electrical, hydraulic or pneumatic failure, and which provides cost and ease of manufacturing advantages over the prior art systems.

SUMMARY OF THE INVENTION

Accordingly, it is an object of the invention to provide a parking brake control assembly which provides redundant control outputs to ensure parking brake integrity.

Still another object of the invention is to provide a parking brake control assembly of the above character which is easier and more cost effective to manufacture than prior art control assemblies.

Yet another object of the invention is to provide an actuator spring for a parking brake control assembly which will accommodate electrical, hydraulic or pneumatic failure, without compromising parking brake integrity.

These and other objects are realized by a parking brake control assembly for a motor vehicle which includes a housing, a movable actuator disposed in the housing which is operable to apply or release parking brakes, and an actuator spring pivotably mounted in the housing. The actuator spring pivots in response to the movement of the movable actuator. A portion of the actuator spring is biased to a first position by a predetermined force, and if the force applied on the portion exceeds the predetermined force, the portion moves to a second position. The housing also houses a switch actuatable by movement of the movable actuator for indicating desired position of the parking brakes, and a piston in fluid communication with a source of fluid. The piston is positioned adjacent the portion of the actuator spring, and the piston is movable by the pivoting movement of the actuator spring to cause fluid to be ejected such that the ejected fluid indicates desired position of the parking brakes.

The invention and its particular features and advantages will become more apparent from the following detailed description considered with reference to the accompanying drawings.

DETAILED DESCRIPTION OF THE INVENTION

Figure 1:
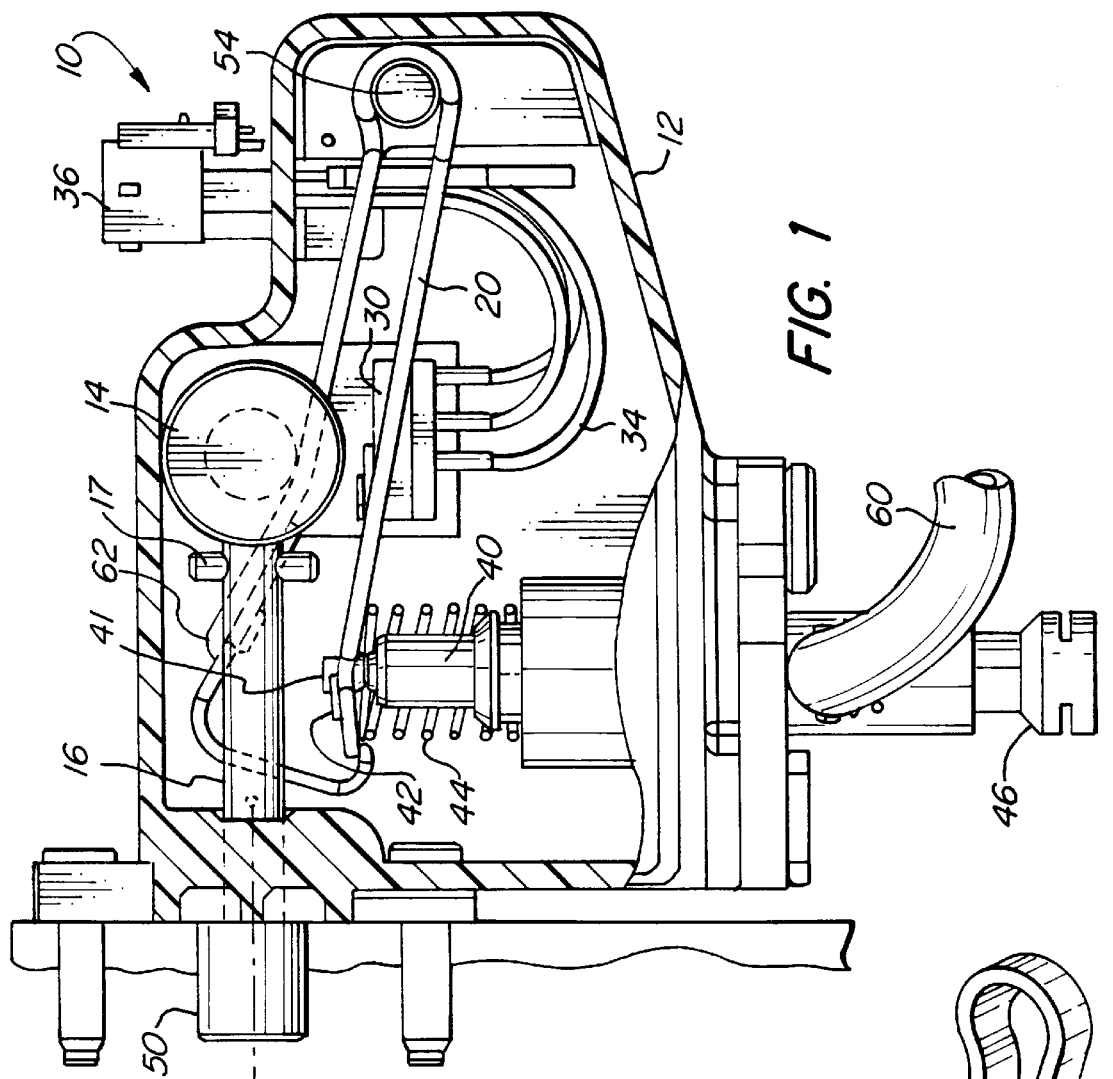
FIG. 1 is a cross-sectional view of an embodiment of a parking brake control assembly of the present invention showing the parking brake control assembly in parking brakes release position.

Referring to FIG. 1, there is shown an embodiment of a parking brake control assembly 10 for a motor vehicle in accordance with the invention, which includes a housing 12 preferably made of plastic to provide a higher degree of corrosion protection for the components it houses. Furthermore, the plastic housing 12 is more cost effective to manufacture than a steel or other metal housing.

Housed inside the housing 12 are a movable actuator rod assembly, which is shown in FIG. 1 as an actuator rod 16 rotatably secured to rollers 14 and a cam follower 15 (better shown in FIG. 3), an actuator spring 20, a switch 30, and a piston 40. The movable actuator rod assembly may take the form of other actuators known to those in the art which provide smooth, low friction actuation. The actuator rod 16 has a head portion 50 located external to the housing 12 which receives a parking brake actuator 52, only a portion of which is shown. The parking brake actuator 52, which is manually actuatable by an operator of the motor vehicle for applying or releasing the parking brakes (not shown), is coupled to the head portion 50 of the actuator rod 16 by a ball and socket connection or other conventional connection means.

Figure 2:
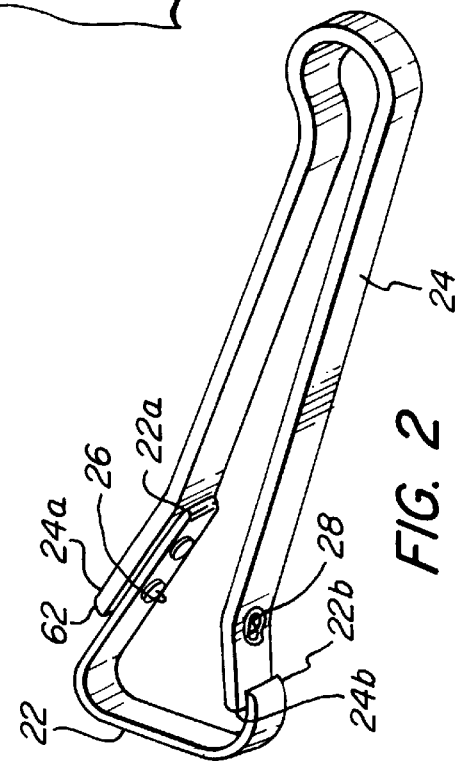
FIG. 2 is a perspective view of a pivotable actuator spring of the parking brake control assembly of FIG. 1.

The actuator spring 20 is pivotably disposed about a pivot 54 in the housing 12. As shown in greater detail in FIG. 2, the actuator spring 20 includes a first spring member 22 having a first end 22a and a second end 22b and a second spring member 24 having a first end 24a and a second end 24b. The first and second spring members 22, 24 are secured to one another by the first ends 22a, 24a being affixed. The first ends 22a, 24a may be affixed together by rivets 26, as illustrated, or other conventional securing means. The second ends 22b, 24b are positioned substantially proximate one another; however, they are not affixed together. The reason for this will become apparent hereinbelow.

The second spring member 24 has an aperture 28 which is sized to receive a mating end 41 of the piston 40. The mating end 41 of the piston 40 is retained by the aperture 28 of the actuator spring 20 by a spring retainer 42 of the mating end 41, as shown in FIG. 1, or other conventional retaining means. Disposed about the piston 40 and abutting the second spring member 24 is a coil spring 44 having a predetermined spring force. As defined herein, "predetermined spring force" is the force which must be overcome to compress the spring 44. The second spring member 24 has a predetermined force which must be overcome to move the second spring member 24 from a first position, shown in FIG. 3, to a second position, shown in FIG. 4. Note that the predetermined force of the second spring member 24 exceeds the predetermined spring force of the coil spring 44. Thus, if a force is applied by the second spring member 24 on the coil spring 44, the coil spring 44 will compress.

Figure 3:
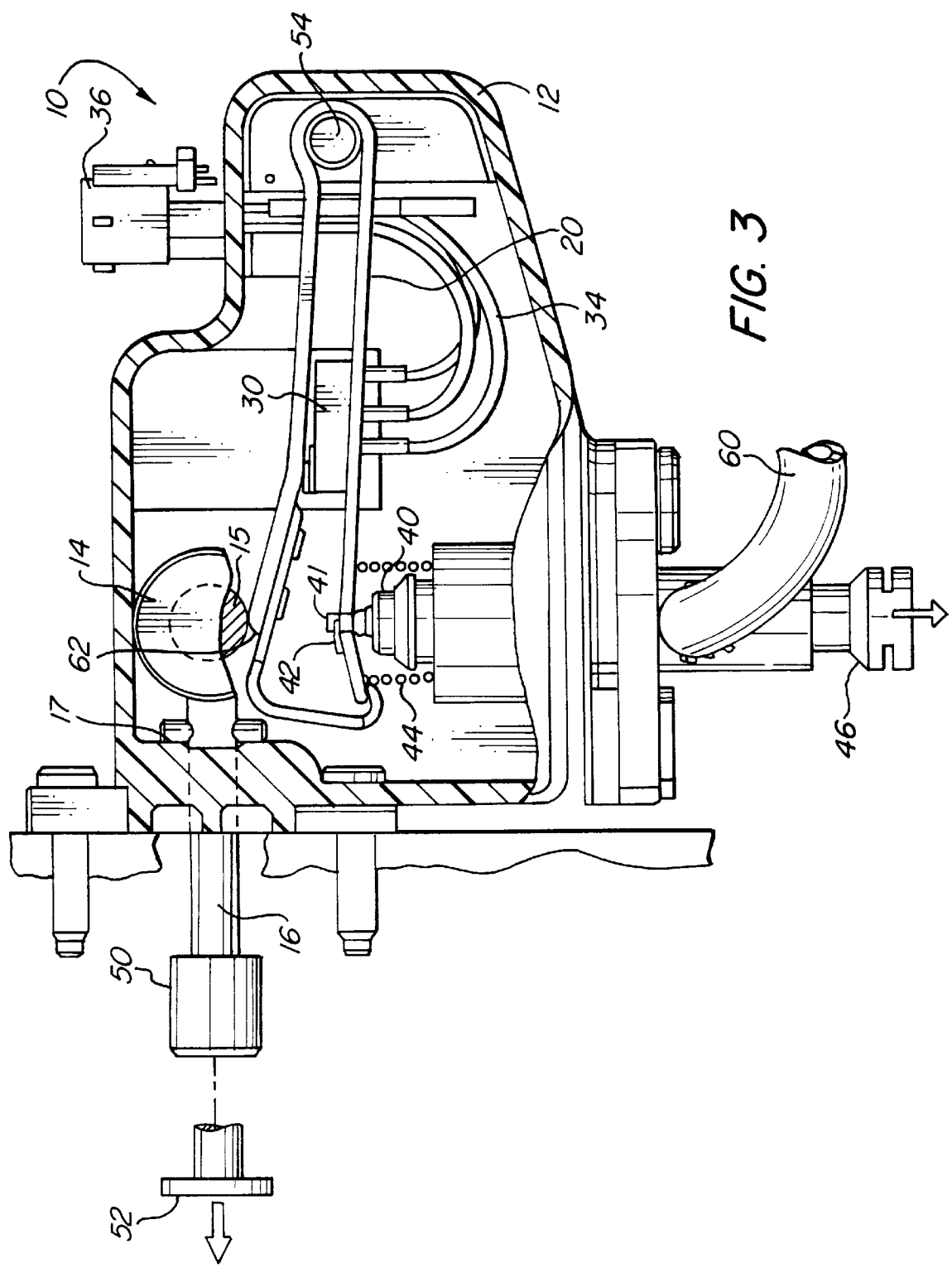
FIG. 3 is a cross-sectional view of the parking brake control assembly of FIG. 1 in parking brakes engaged position, illustrating a portion of the pivotable actuatable spring in its first position.

The piston 40 is in fluid communication via a tube 60 or other conventional conduit means to a source of fluid (not shown). Preferably, this fluid is hydraulic fluid. Note that pressurized air may be used in place of the fluid as the medium of choice, if desired. As used herein, "fluid" will refer to both fluid and pressurized air. A fluid outlet member 46 in fluid communication with the piston 40 has an opening through which the fluid is expelled by the pumping motion of the piston 40, as illustrated in FIG. 3. As will be described hereinbelow, the expelled pressurized fluid serves as one of two means for application of the parking brake(s). It will be appreciated by those skilled in the art that where pressurized air is used, a valve or the like is necessary for properly indicating the desired position of the parking brakes.

The switch 30 is positioned such that with the movable actuator rod assembly 14, 15, 16 moved to the position shown in FIG. 1 by the actuation of the parking brake actuator 52, which for illustrative purposes will be deemed to correspond to the parking brakes release position, the switch 30 is actuated by one of the rollers 14. The switch 30 provides an electrical indication of the position of the parking brakes desired by the operator of the motor vehicle. This electrical indication is transmitted through wires 34 to an external electronic control unit or a solenoid and a relay (not shown) for controlling parking brakes application or release. In FIG. 1, the actuation of the switch 30 will cause parking brakes to release. The external electronic control unit or solenoid and relay is electrically coupled to the switch 30 by a conventional electrical connector 36.

The operation of the parking brake control assembly 10 of the invention will be described with respect to FIGS. 1 and 3. Let's assume that the motor vehicle is being operated with the parking brakes released. As discussed above, this is the position of the movable actuator rod assembly 14, 15, 16 illustrated in FIG. 1. When the operator of the motor vehicle decides to apply the parking brakes, he actuates the parking brake actuator 52, as shown in FIG. 3. Preferably, the parking brake control assembly 10 is attached to the motor vehicle firewall or a bracket in the engine compartment, with the parking brake actuator 52 accessible from the motor vehicle dashboard.

The actuation of the parking brake actuator 52 with the parking brakes released causes the movable actuator rod assembly 14, 15, 16 to move to the position shown in FIG. 3, with stop pins 17 on the actuator rod 16 abutting the inner surface of the housing 12. As the movable actuator rod assembly moves, it causes the actuator spring 20 to pivot into the piston 40 as illustrated in FIG. 3. Since the predetermined force of the second spring member 24 is greater than the predetermined spring force of the coil spring 44, the coil spring 44 will compress as a result of the actuator spring 20 pivoting into the piston 40. In conjunction with the compression of the coil spring 44, the piston 40 will move so as to cause fluid to be pressurized and expelled through the fluid outlet member 46, as discussed above. The expelled pressurized fluid is received by a control valve (not shown) for controlling the parking brake(s) application.

Furthermore, as the movable actuator rod assembly 14, 15, 16 moves to the position shown in FIG. 3, the switch 30 is deactivated since it is no longer actuated by one of the rollers 14. This deactivation of the switch 30 serves to electrically indicate to the external electronic control unit or the solenoid and relay (not shown) that the parking brakes are to be applied.

Figure 4:
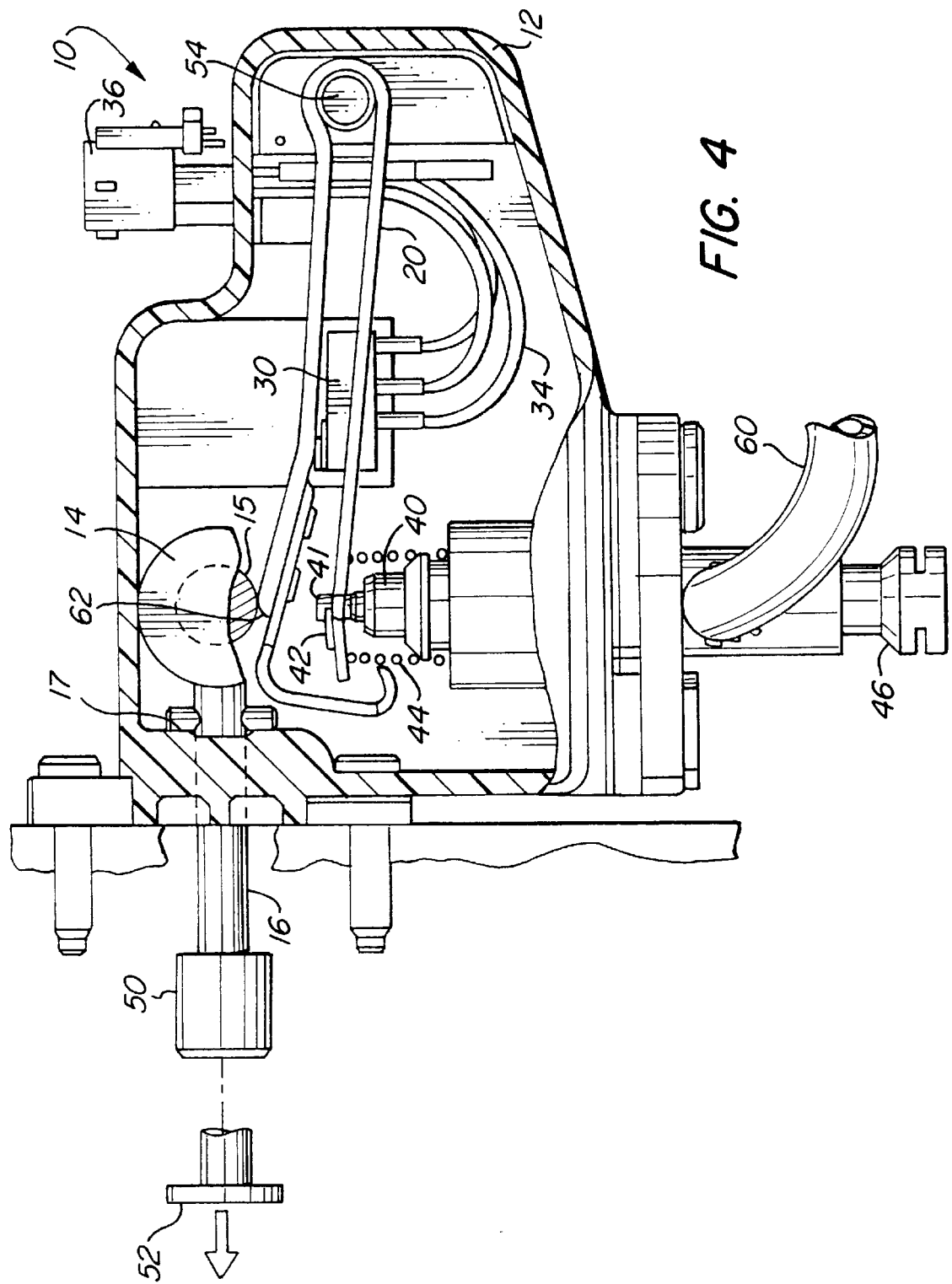
FIG. 4 is a cross-sectional view of the parking brake control assembly of FIG. 1 in parking brakes engaged position with piston lock, illustrating a portion of the pivotable actuatable spring in its second position.

The redundant control outputs for controlling the parking brakes provided by the parking brake control assembly 10 of the present invention provide parking brake integrity since if there is an electrical, hydraulic or pneumatic failure, the control of the parking brakes is not compromised. For example, let's assume that a crimped hydraulic line leads to a hydraulic lock failure, as shown in FIG. 4. In this case, the locking of the piston 40 causes the second spring member 24 to move from the first position (shown in FIG. 3) to the second position (shown in FIG. 4), and no fluid is received by the control valve to indicate the desired position of the parking brakes. However, movement of the movable actuator rod assembly is not impeded and electrical indication of the desired position of the parking brakes continues to be provided by the switch 30.

Conversely, if there is loss of electrical power, the switch 30 will not provide the desired position of the parking brakes. However, the expelled fluid received by the control valve controls the parking brake application.

Note that the first end 24a of the second spring member 24 is shaped to serve as a detent ramp 62 as illustrated in FIG. 3. This detent ramp 62 prevents the movable actuator rod assembly 14, 15, 16 from moving to parking brakes release position without the application of a predetermined pushoff force by the operator of the vehicle through the parking brake actuator 52. Also, it must be noted that although the actuator spring 20 is shown heretofore as preferably including two spring members 22 and 24, it may include one or more spring members.

It should be understood by those skilled in the art that indicators, such as an LED or an audible signal generator, may be electrically coupled to the parking brake control assembly 10 of the present invention to provide indication of the operation of the parking brake control assembly 10 and/or indication of a failure condition within the parking brake control assembly 10.

Although the invention has been described with reference to particular arrangements of parts, features, and the like, these are not intended to exhaust all possible parts, arrangements or features, and indeed, may other modifications and variations will be ascertainable to those of skill in the art.

What is claimed is:

1. A parking brake control assembly for a motor vehicle, which comprises:
   a housing;
   a movable actuator disposed in said housing, said movable actuator operable to apply or release parking brakes;
   an actuator spring pivotably mounted in said housing, said actuator spring pivoting with the movement of said movable actuator;
   a portion of said actuator spring biased to a first position by a predetermined force, said portion of said actuator spring being movable to a second position if a force applied thereon exceeds said predetermined force;
   a switch actuatable by movement of said movable actuator for indicating desired position of the parking brakes; and
   a piston in fluid communication with a source of fluid adjacent said portion of said actuator spring, said piston movable by the pivoting movement of said actuator spring to cause fluid to be ejected such that said ejected fluid indicates desired position of the parking brakes.

2. The parking brake control assembly of claim 1, wherein said actuator spring comprises a first spring member having a first end and a second end and a second spring member having a first end and a second end, said first ends of said spring members being affixed to one another and said second ends of said spring members being substantially proximate one another.

3. The parking brake control assembly of claim 1, wherein said portion of said actuator spring has an aperture for receiving said piston such that said piston is retained by said actuator spring.

4. The parking brake control assembly of claim 1, wherein said actuator spring includes a detent ramp which is adjacent said movable actuator when said movable actuator is in parking brakes apply position to prevent said movable actuator from moving to parking brakes release position without a preselected force being applied thereto.

5. An actuator spring for a parking brake control assembly for a motor vehicle, the parking brake control assembly including a housing within which are disposed a movable actuator operable by an operator of the motor vehicle for applying or releasing parking brakes, a switch responsive to movement of said movable actuator for indicating a desired position of the parking brakes, and a piston in fluid communication with a source of fluid to cause ejection of pressurized fluid to indicate desired position of the parking brakes, said actuator spring comprising:
   a first spring member having a first end and a second end and a second spring member having a first end and a second end, said first ends of said spring members being affixed to one another;
   said actuator spring pivotably mounted in said housing, said actuator spring pivoting with the movement of said movable actuator;
   said second spring member adjacent said piston to move said piston when said actuator spring is pivoting, said second spring member being biased to a first position by a predetermined force, and said second spring member being movable to a second position if a force applied thereon by said piston exceeds said predetermined force; and
   a detent ramp which is adjacent said movable actuator when said movable actuator is in parking brakes apply position to prevent said movable actuator from moving to parking brakes release position without a preselected force being applied thereto.

6. The actuator spring of claim 5, wherein said second spring member has an aperture for receiving said piston such that said piston is retained by said actuator spring.

7. The actuator spring of claim 5, wherein said second ends of said spring members are substantially proximate one another.

8. A parking brake system for a motor vehicle, which comprises:
   parking brakes; and
   a parking brake control assembly for controlling operation of said parking brakes, said parking brake control assembly including:
   a housing;
   a movable actuator disposed in said housing, said movable actuator operable by an operator of the motor vehicle for applying or releasing said parking brakes;
   an actuator spring pivotably mounted in said housing, said actuator spring pivoting with the movement of said movable actuator;
   a portion of said actuator spring biased to a first position by a predetermined force, said portion of said actuator spring being movable to a second position if a force applied thereon exceeds said predetermined force;
   a switch actuatable by movement of said movable actuator for indicating desired position of said parking brakes; and
   a piston in fluid communication with a source of fluid adjacent said portion of said actuator spring, said piston movable by the pivoting movement of said actuator spring to cause fluid to be ejected such that said ejected fluid indicates desired position of said parking brakes.

9. The parking brake system of claim 8, wherein said actuator spring comprises a first spring member having a first end and a second end and a second spring member having a first end and a second end, said first ends of said spring members being affixed to one another and said second ends of said spring members being substantially proximate one another.

10. The parking brake system of claim 9, wherein said second spring member has an aperture for receiving said piston such that said piston is retained by said actuator spring.

11. The parking brake system of claim 8, wherein said actuator spring includes a detent ramp which is adjacent said movable actuator when said movable actuator is in parking brakes apply position to prevent said movable actuator from moving to parking brakes release position without a preselected force being applied thereto.

\* \* \* \* \*